(12) United States Patent
Bizzarri et al.

(10) Patent No.: US 8,407,038 B2
(45) Date of Patent: Mar. 26, 2013

(54) METHOD FOR SIMULATING A COMMUNICATION NETWORK THAT CONSIDERS QUALITY OF SERVICE

(75) Inventors: Simone Bizzarri, Turin (IT); Paolo Goria, Turin (IT)

(73) Assignee: Telecom Italia S.p.A., Milan (IT)

( * ) Notice: Subject to any disclaimer, the term of this patent is extended or adjusted under 35 U.S.C. 154(b) by 878 days.

(21) Appl. No.: 10/580,268

(22) PCT Filed: Nov. 27, 2003

(86) PCT No.: PCT/IT03/00783
§ 371 (c)(1),
(2), (4) Date: May 25, 2006

(87) PCT Pub. No.: WO2005/053341
PCT Pub. Date: Jun. 9, 2005

(65) Prior Publication Data
US 2007/0097868 A1 May 3, 2007

(51) Int. Cl.
*G06F 9/455* (2006.01)

(52) U.S. Cl. ............... 703/22; 703/13; 703/20; 703/21; 370/254; 370/259; 709/220

(58) Field of Classification Search .................... 703/13, 703/17, 21, 20, 22; 370/254, 400, 259; 709/220, 709/223
See application file for complete search history.

(56) References Cited

U.S. PATENT DOCUMENTS

| | | | | |
|---|---|---|---|---|
| 5,809,282 | A * | 9/1998 | Cooper et al. | 709/226 |
| 6,023,456 | A * | 2/2000 | Chapman et al. | 370/252 |
| 6,094,687 | A * | 7/2000 | Drake et al. | 709/241 |
| 6,336,035 | B1 * | 1/2002 | Somoza et al. | 455/446 |
| 6,421,350 | B1 * | 7/2002 | Szurkowski et al. | 370/419 |
| 6,442,615 | B1 * | 8/2002 | Nordenstam et al. | 709/241 |
| 6,466,925 | B1 * | 10/2002 | Harald et al. | 706/16 |
| 6,690,678 | B1 * | 2/2004 | Basso et al. | 370/468 |
| 6,862,291 | B2 * | 3/2005 | Talpade et al. | 370/412 |
| 6,959,335 | B1 * | 10/2005 | Hayball et al. | 709/227 |
| 6,985,439 | B2 * | 1/2006 | Hosein | 370/230 |

(Continued)

FOREIGN PATENT DOCUMENTS

| | | |
|---|---|---|
| EP | 1 359 780 A1 | 11/2003 |
| WO | WO-02/104055 A1 | 12/2002 |

OTHER PUBLICATIONS

Hirose et al.; "Method and System for Comprehensive Evaluation Simultation of Mobile Communication Network"; Patent Abstracts of Japan of JP-07-283778, filed Oct. 27, 1995.

*Primary Examiner* — Saif Alhija
*Assistant Examiner* — Kibrom Gebresilassie
(74) *Attorney, Agent, or Firm* — Finnegan, Henderson, Farabow, Garrett & Dunner, L.L.P.

(57) ABSTRACT

A method for simulating a telecommunications network through objects that model respective network devices provides for simulating through the objects, the supply of network services according to respective quality of service profiles, by selectively identifying at least one quality of service profile, and dynamically configuring the objects to simulate the supply of the service corresponding to the selectively identified quality of service profile. In the simulation of networks having mobile terminals, the quality of service profile preferably has parameters chosen from traffic class, maximum transfer time of a data unit, guaranteed transfer speed for data transmitted by mobile terminal toward the network, maximum transfer speed for data transmitted from mobile terminal toward the network, guaranteed transfer speed for data transmitted by the network toward mobile terminal, and maximum transfer speed for data transmitted by the network toward mobile terminal.

18 Claims, 5 Drawing Sheets

U.S. PATENT DOCUMENTS

Figure 8:
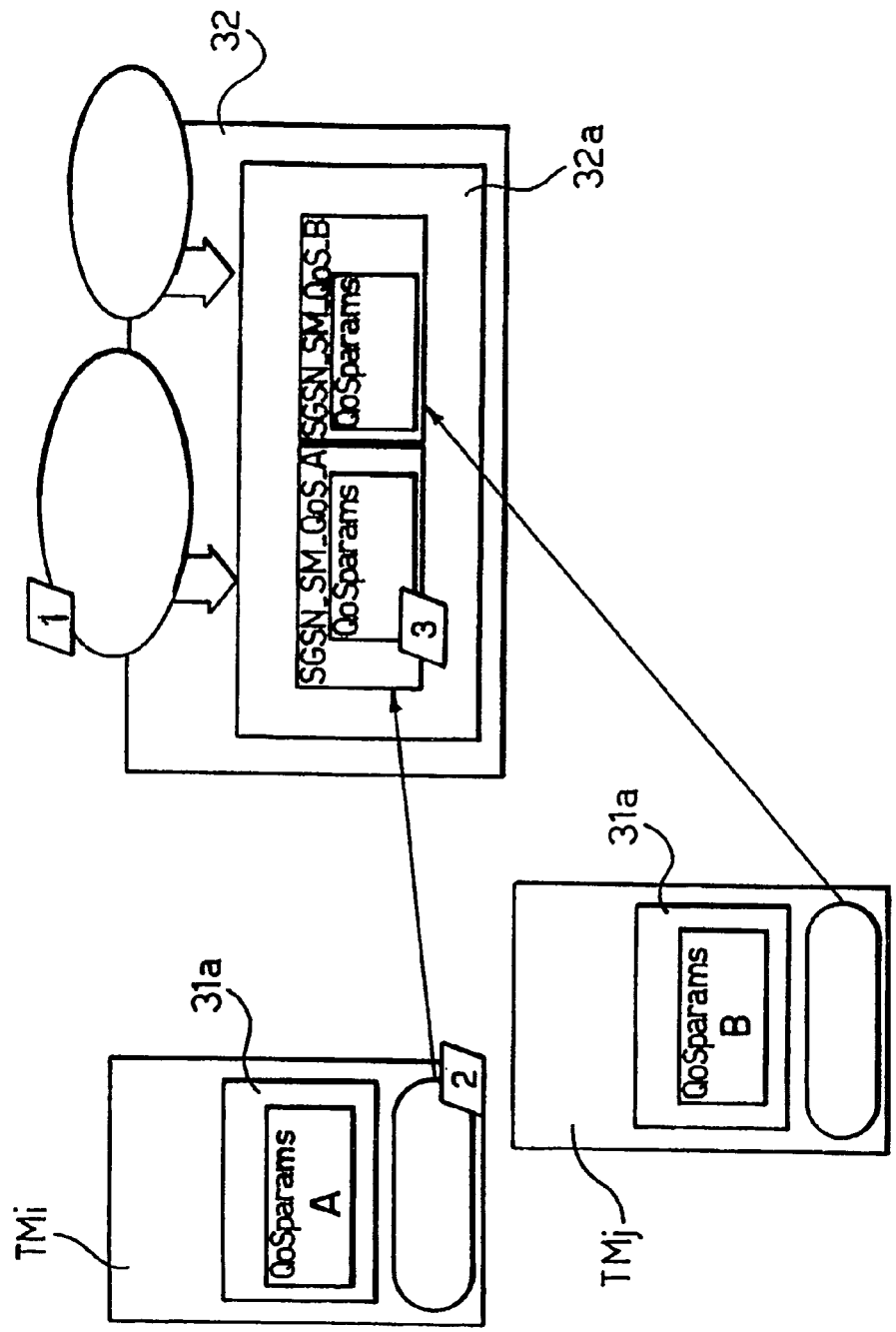

| | | | |
|---|---|---|---|
| 7,174,285 B1* | 2/2007 | Garney | 703/21 |
| 7,263,471 B2* | 8/2007 | Barbaresi et al. | 703/2 |
| 7,295,960 B2* | 11/2007 | Rappaport et al. | 703/13 |
| 7,489,635 B2* | 2/2009 | Evans et al. | 370/235 |
| 7,698,457 B2* | 4/2010 | Ghetie et al. | 709/238 |
| 7,746,799 B2* | 6/2010 | Kokot et al. | 370/252 |
| 8,185,146 B2* | 5/2012 | Dinan et al. | 455/522 |
| 8,311,574 B1* | 11/2012 | Dinan et al. | 455/522 |
| 2001/0031625 A1* | 10/2001 | Lynn | 455/67.1 |
| 2002/0025812 A1* | 2/2002 | Ahlstrand et al. | 455/435 |
| 2002/0145982 A1* | 10/2002 | Talpade et al. | 370/253 |
| 2003/0045298 A1* | 3/2003 | Linton et al. | 455/452 |
| 2003/0061017 A1 | 3/2003 | Dotaro et al. | |
| 2003/0074443 A1* | 4/2003 | Melaku et al. | 709/224 |
| 2003/0100299 A1* | 5/2003 | Ko et al. | 455/423 |
| 2003/0101034 A1* | 5/2003 | Tillotson | 703/13 |
| 2003/0142681 A1* | 7/2003 | Chen et al. | 370/401 |
| 2003/0204390 A1* | 10/2003 | Bizzarri et al. | 703/21 |
| 2004/0032857 A1* | 2/2004 | Tannan | 370/351 |
| 2004/0057456 A1* | 3/2004 | He et al. | 370/465 |
| 2004/0110509 A1* | 6/2004 | Fattouch et al. | 455/445 |
| 2004/0111502 A1* | 6/2004 | Oates | 709/223 |
| 2004/0117226 A1* | 6/2004 | Laiho et al. | 705/7 |
| 2004/0143428 A1* | 7/2004 | Rappaport et al. | 703/22 |
| 2004/0185786 A1* | 9/2004 | Mirbaha et al. | 455/67.11 |
| 2004/0203727 A1* | 10/2004 | Abiri et al. | 455/423 |
| 2004/0208547 A1* | 10/2004 | Sabat et al. | 398/50 |
| 2004/0209612 A1* | 10/2004 | Barberis et al. | 455/423 |
| 2004/0214577 A1* | 10/2004 | Borst et al. | 455/446 |
| 2004/0236547 A1* | 11/2004 | Rappaport et al. | 703/2 |
| 2004/0258003 A1* | 12/2004 | Kokot et al. | 370/254 |
| 2005/0120097 A1* | 6/2005 | Walton et al. | 709/220 |
| 2005/0180427 A1* | 8/2005 | Eriksson et al. | 370/395.4 |
| 2005/0262228 A1* | 11/2005 | Trappeniers et al. | 709/223 |
| 2006/0029067 A1* | 2/2006 | Conway | 370/389 |
| 2006/0083170 A1* | 4/2006 | Silva et al. | 370/238 |
| 2006/0142001 A1* | 6/2006 | Moisan et al. | 455/428 |
| 2006/0291455 A1* | 12/2006 | Katz et al. | 370/355 |
| 2007/0127393 A1* | 6/2007 | Car | 370/254 |
| 2007/0171834 A1* | 7/2007 | Sathyanarayana et al. | 370/241 |
| 2007/0299746 A1* | 12/2007 | Haley et al. | 705/28 |
| 2008/0107084 A1* | 5/2008 | Pichna et al. | 370/332 |
| 2009/0067367 A1* | 3/2009 | Buracchini et al. | 370/328 |
| 2009/0254330 A1* | 10/2009 | Goria | 703/13 |
| 2009/0279701 A1* | 11/2009 | Moisand et al. | 380/270 |
| 2012/0134286 A1* | 5/2012 | Bhalla | 370/252 |
| 2012/0236716 A1* | 9/2012 | Anbazhagan et al. | 370/235 |

* cited by examiner

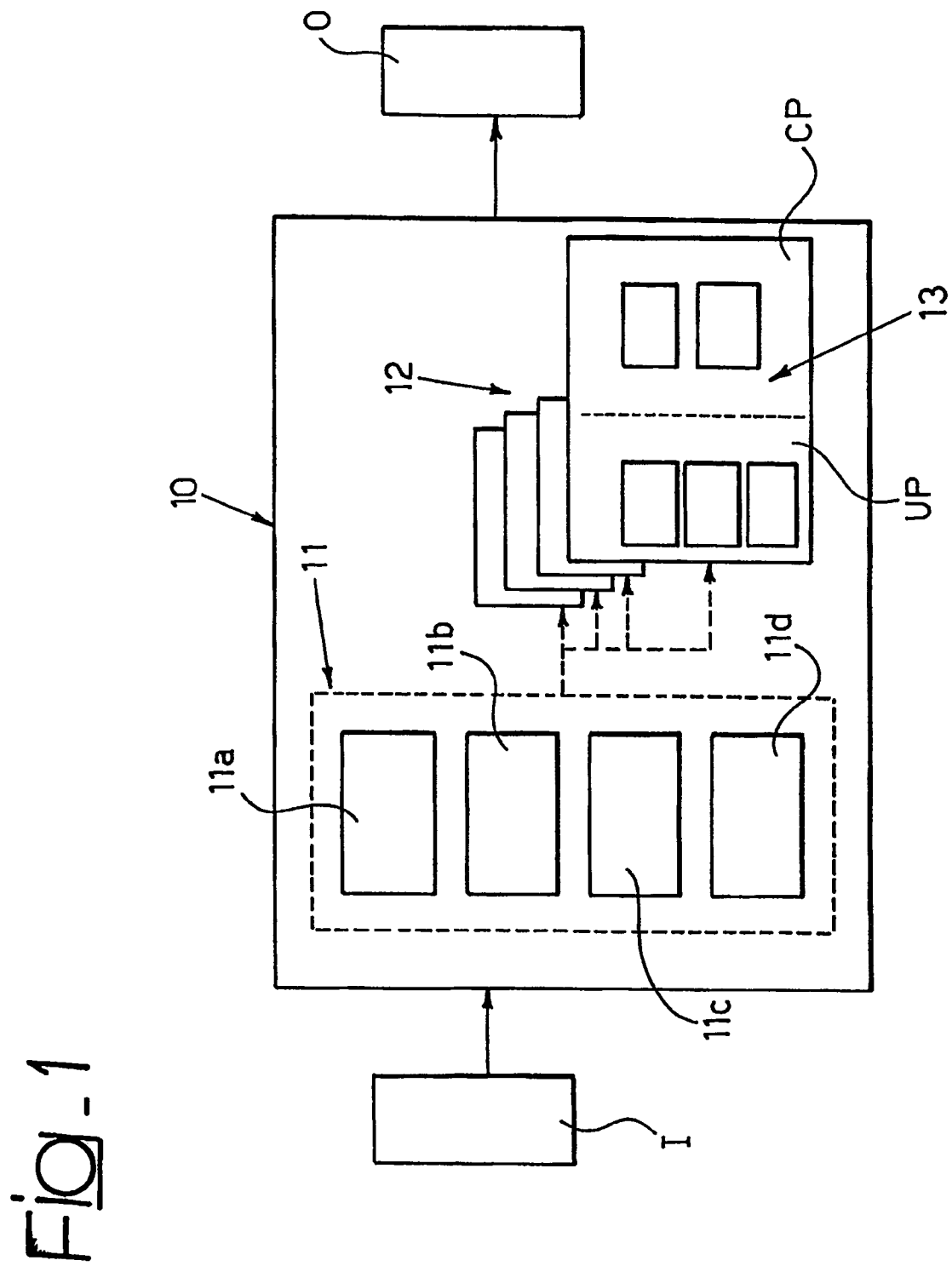

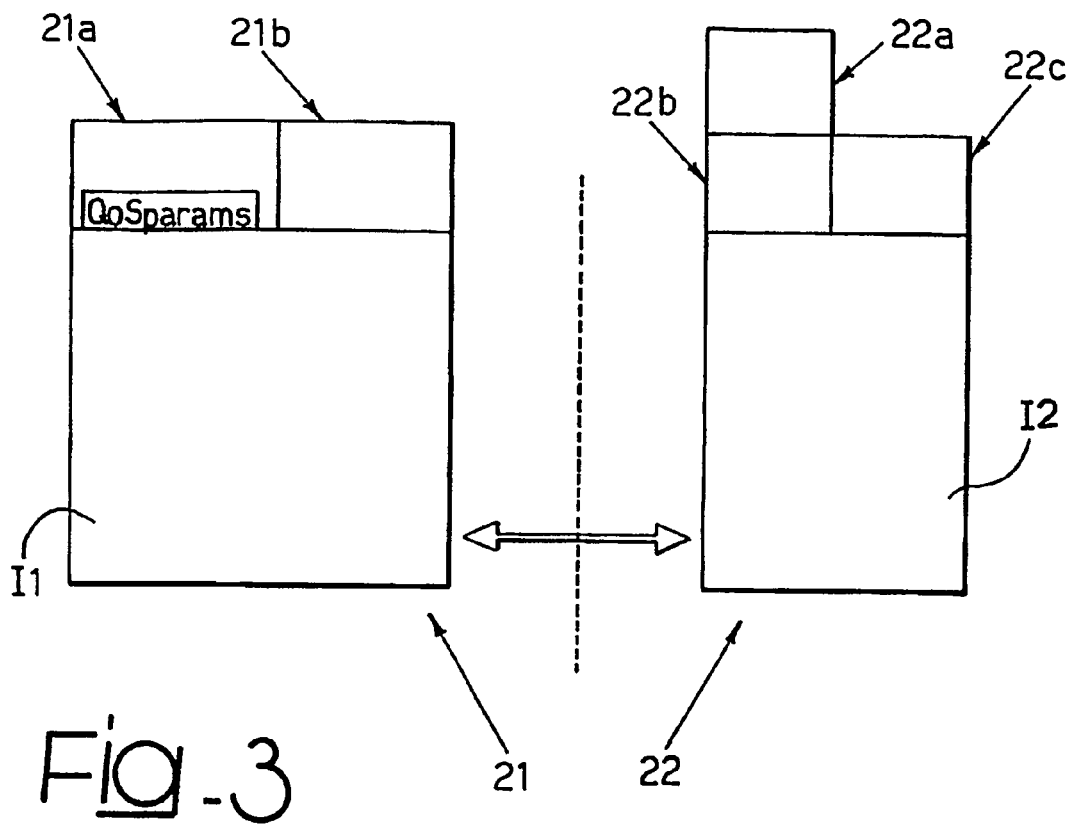
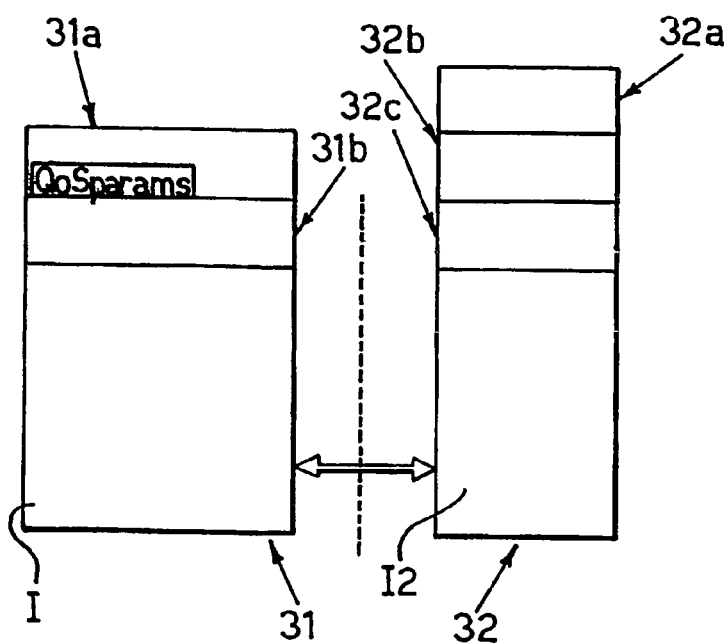

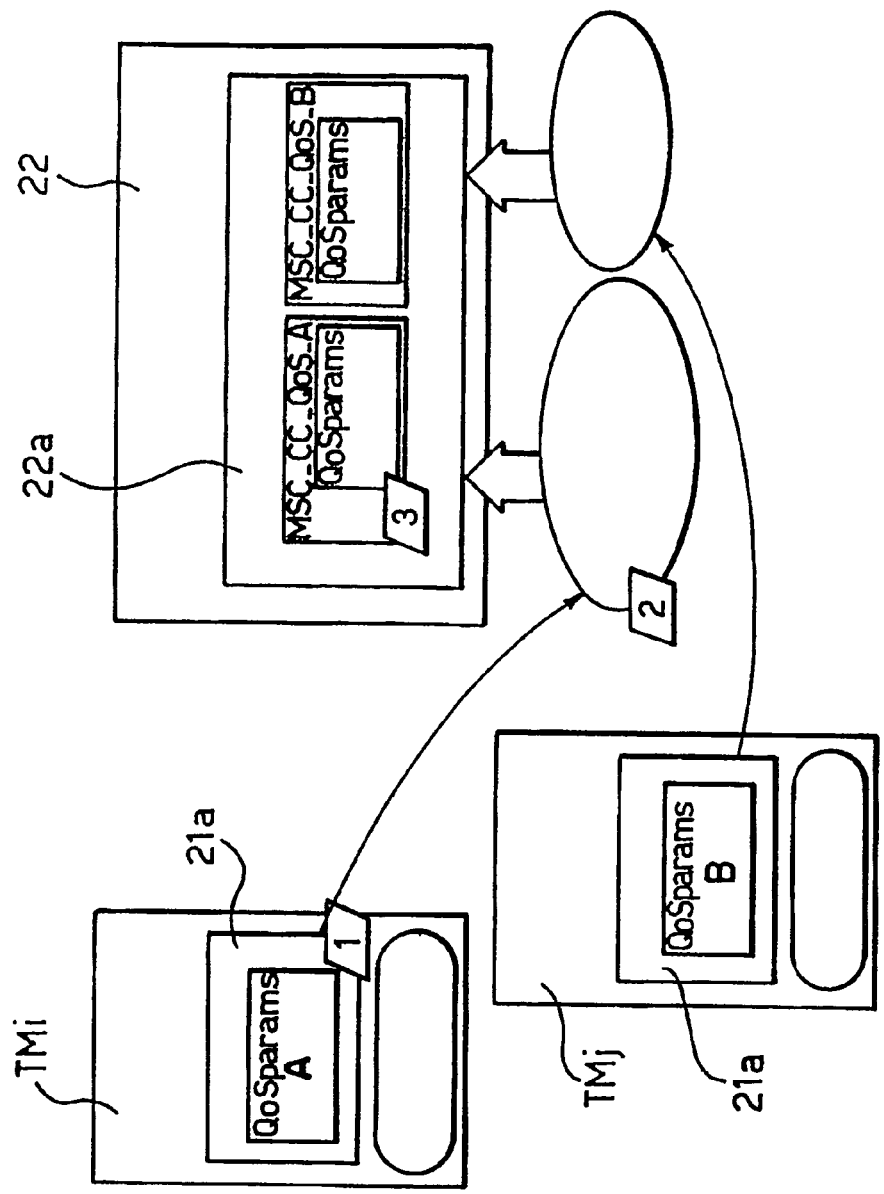
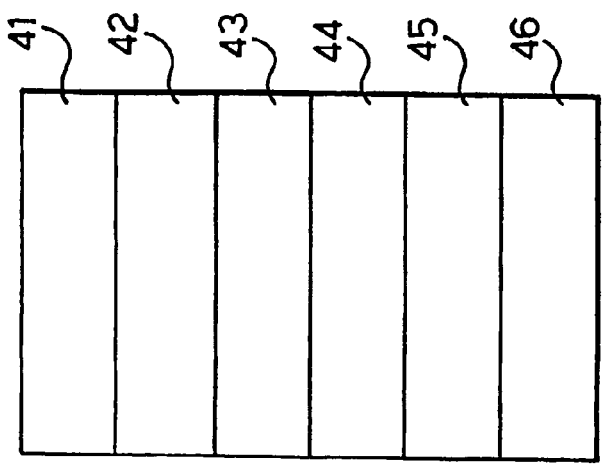

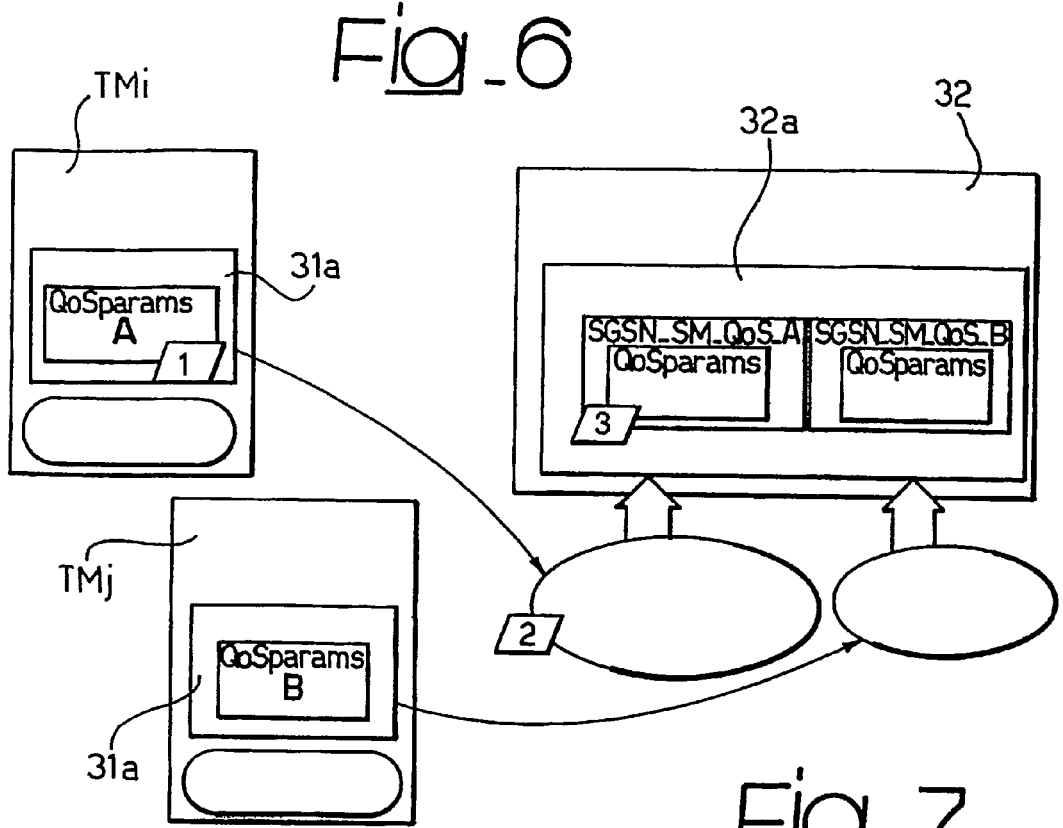
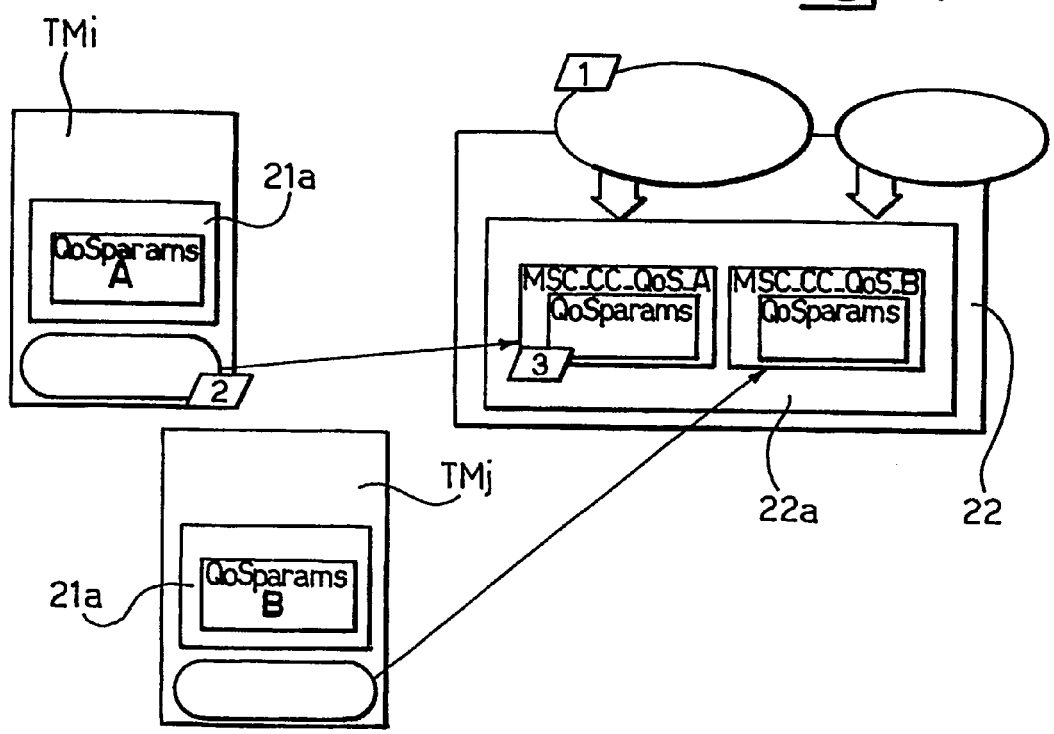

METHOD FOR SIMULATING A COMMUNICATION NETWORK THAT CONSIDERS QUALITY OF SERVICE

CROSS REFERENCE TO RELATED APPLICATION

This application is a national phase application based on PCT/IT2003/000783, filed Nov. 27, 2003, the content of which is incorporated herein by reference.

FIELD OF THE INVENTION

The present invention refers to techniques for simulating communications networks such as, for example, radio-mobile cellular networks.

Simulation is an essential step in planning, designing, realising and managing such networks, above all in view of optimising network performances. In particular, simulation plays an important role both at check level for new planning network, and at update and optimisation level of performances of an already set-up network.

The invention has been devised paying particular care to the setting up of such simulation techniques as to produces parameters that can be used for evaluating the so-called Quality of Service (QoS) of the simulated network.

DESCRIPTION OF THE PRIOR ART

A communications network, such as a radio-mobile cellular network, offers quality of service when it is able to deal with the traffic produced by different applications in such to way as to satisfy their requests.

The quality of service is therefore an indicator of the network capability of offering a different management to different data flows. In general, the quality of service must be present along the whole data flow path (end-to-end).

It is known that there are cellular radio-mobile network system simulators characterised by an object architecture, such as disclosed, for example, in WO-A-02/104055. According to the object approach, the elementary decomposition unit is not the operation (method), but the object, meant as model of a real entity (a real-world object).

It is known that in such simulators there are modules or devices adapted to simulate the behaviour of physical network devices. It is also known that a typical problem in developing system simulators, realised with such architecture, is linked to the need of managing the simultaneous simulation of calls realised by users that use services having different quality requirements.

It is also known that in such simulators it is possible to simulate different types of services, but these different services are completely defined previously inside the simulator and cannot be dynamically modified by a user. For example, in a simulator as disclosed in WO-A-02/104055 it is possible to simulate call with GSM voice service and calls with GPRS data service. The user of such simulator can only set, at the simulation beginning, how many simulated users perform GSM voice calls and how many perform GPRS data calls.

In JP07283778A2 instead a system is disclosed for globally evaluating the arrangement or realisation of a cellular network, taking also into account costs and quality of supplied service. The case of having many QoS profiles is not dealt with.

Moreover, in US20030045298A1 a method is described for foreseeing the behaviour of an application using the results of a network simulation. It is provided to get the application responses when the speed and the simulated area position change. To do this, maps of QoS of the simulated area are used and, through the values of QoS being, found in the maps, the behaviour of the considered application is provided in the various positions inside the area. It is therefore only a different possible use of the simulation results that a traditional simulator is able to furnish with respect to a given application.

PURPOSE AND SYNTHESIS OF THE PRESENT INVENTION

In the known type of simulators, particularly for cellular networks, it is not possible for the user to dynamically describe the applications or the services to simulate (for instance: sounds, web browsing, streaming audio and/or video, e-mail, ... ). Besides it is not possible to associate to every simulated user a potentially different service from that of the other users. Particularly, it is not possible to dynamically define a QoS profile that contains the characteristics of a particular service; neither it is possible to define a QoS profile for every simulated user that is different from the profiles of the other users.

This means, that the known solutions allow simulating a communications network through objects that model respective network devices, simulating through such objects the network services delivery according to respective quality profiles of service, that however are referred to a certain user typology; the various users, for instance "sound user", "data user", etc., are fixed, particularly as regards the service parameters (available band, transfer times, transfer speed, ... ).

In other words, in the solutions according to the known art, it is at most possible to only simulate a very narrow number of predefined "populations" of services or user typologies. The Applicant has observed that this corresponds to a representation that is a great deal far away from the current operating reality of a communications network, where a high number of services corresponding to a wide range of possible delivery and use modes are mutually coexisting and interacting, particularly as regards the use of the network resources.

Object of the present invention is therefore overcoming the above-mentioned drawbacks, both the mode with which dynamically describing the different services inside the simulator, and the way of managing the possibility that every user can use a different service from those used by the other users, being able to be determine. Everything in a dynamic picture that corresponds in a more faithful and direct way to the operating reality of a communications network, in order to allow planning, designing, realising, managing and optimising the network in terms of QoS. This also as regards the possibility of defining new service profiles to simulate, in a flexible way and/or without having to proceed to the complete re-design of the correspondents simulation objects, also making the management of services at simulation level more slender.

According to the present invention, such object is reached due to a method having the characteristics recalled in specific way in the claims that follow. The invention also deals with the corresponding system (simulator), the simulation objects herein included, the network deriving from the application of the method according to the inventions as well as a corresponding information product loadable in the memory of at least one electronic computer and comprising portions of software code to perform the method according to the invention when the product is executed on a computer: in this context such term has to be deemed entirely equivalent to the mention of readable means from a computer comprising instructions to check a network of computers in order to perform a method according to the invention. The reference to "at least one electronic computer", is obviously aimed to show the possibility to perform the solution according to the invention in a de-centralized context.

Substantially, the currently-preferred embodiment of the invention provides for the selective identification of at least one quality of service profile. The simulation objects are then dynamically configured then for simulating the service delivery corresponding to the quality of service profile that has been selectively identified.

In the currently-preferred embodiment, the solution herein described solves the above-mentioned technical problem through one or more of the following innovative elements:

introduction of such a typology of "quality of service profile" that every profile describes the quality requirements of a single service; by setting different requirements, the profile defines a different service;

identification of parameters that define every service: the service quality requirements can be expressed through different parameters (service class, transfer delay, maximum bit rate respectively for uplink section and for downlink section, guaranteed bit rate respectively for uplink section and for downlink section); every value given to service quality parameters univocally defines a type of service. Such parameters are grouped together and constitute the attributes of the single "quality of service profile": the simulator user can set as input the values of different parameters of every profile of quality, dynamically varying the simulated services;

possibility to define different service quality profiles for every simulated user: every simulated user has at least his own "quality of service profile" that can be set by the user; in this way it is possible to perform simulations in which every user can use a different service from those used by the other users.

It is thereby possible to determine both the mode with which the different services inside the simulator can be determined, and the way of managing the possibility that every user can use a different service from those used by the other users.

The simulation thereby corresponds in a more faithful and direct way to the operating reality of a communications network, and allows planning, designing, realising, managing and optimising the network in terms of QoS.

It is then allowed to define new service profiles to simulate in a flexible way and/or without having to proceed with the complete re-design of the corresponding simulation objects, also making the service management at simulation level more slender.

BRIEF DESCRIPTION OF THE ATTACHED DRAWINGS

The invention will be described, merely as a non-limiting example, with reference to the attached drawings, in which:

FIG. 1 is a functional approximate diagram of the simulator of the herein-described type, FIGS. 2 and 3 show possible configurations of the aforesaid simulator, FIG. 4 shows a possible definition of quality of service profile within a simulator of the herein-described type, and FIGS. 5 to 8 are exemplifying diagrams of the operating modes of the herein-described simulator.

DETAILED DESCRIPTION OF AN EMBODIMENT OF THE INVENTION

FIG. 1 shows the architecture of a simulator 10 comprising an engine 11 in which all typical functionalities for managing the simulation of a telecommunications network, such as a radio-mobile network, are present, namely:
Parameter Manager 11*a*,
Event Scheduler 11*b*,
Factory Manager 11*c*, and
Statistic Manager 11*d*.

There is also a device package 12 in which the different devices 13 are contained, representative of the physical network devices and the objects related to the scenario to simulate.

Every devices contains different modules related to the different functionalities managed by the device itself.

Such a simulator, working in general among a set of input signals I and a set of output signals, can be implemented, for instance, on a computer with Intel Pentium III processor and Microsoft Windows operating system, using Microsoft Visual I Studio 6.0 development environment and ANSI C++ programming language.

Always as an example, some possible devices 13 present in the package 12 are:
radio-mobile terminal or MS/UE (Mobile Station/User Equipment),
node MSC (Mobile-Switching Center),
node SGSN (Serving GPRS Support Node), and
node GGSN (Gateway GPRS Support Node).

Every device 13 present in the package 12 contains in turn the modules related to the different functionalities and to the different protocols that it implements.

The modules contained inside devices 13 are separated in Control Plane CP and User Plane UP modules. The Control Plane CP modules are related to the functionalities of installation, management and release of the connection; the User Plane UP modules are related to the communication functionalities when the connection is active.

The solution herein described focuses, in particular, on the Control Plane CP characteristics as regards QoS functionalities for 2G (second Generation), 2.5 G and 3 G (for example GSM, GPRS and UMTS) radio-mobile systems.

The Control Plane modules belong to two families, according to the type of connection: Circuit Switched (CS) (namely as circuit switching) or Packet Switched (PS) (namely as packet switching).

In the CS connection case (see FIG. 2), attention is focused on modules MT_CC (Mobile Terminal Call Control) 21*a* and MSC_CC (Mobile Switching Center Call Control) 22*b* that can respectively be found in two devices MS/UE 21 and MSC 22.

Modules MT_CC 21*a* and MSC_CC 22*b* manage the start and release of a call in case of CS (Circuit Switched) circuit services; during the start of a call, said modules communicate the type of service they need, pointing out its related parameters, to respective modules I1 and I2 of radio interface GSM or UMTS.

In device MSC 22*a* module MSC_CC 22*b* is present for every active radio-mobile terminal; the allocation of, different modules MSC_CC 22*b* is the responsibility of a module MSC_CC_Manager 22*a*.

The module MSC_CC_Manager 22*a* manages different typologies of modules MSC_CC 22*b*.

Every module typology corresponds to a different QoS profile. Particularly, module MSC_CC_Manager 22*a* obtains the typology to be use for allocation directly from radio-mobile terminal MS/UE 21, where the type of module MSC_CC is stored in an attribute called "MSC_CC_CLASS_TYPE."

In case of PS connection (see FIG. 3), the attention is focused on modules MT_SM 31a (Mobile Terminal Session Management) and SGSN_SM 32b (Serving GPRS Support Node Session Management) present in respective devices MS/UE 31 and SGSN 32.

Modules MT_SM 31a and SGSN_SM 32b manage the start and release of the call in case of PS (Packet Switched) packet services; during the start of the call said modules communicate the type of service they need, pointing out its related parameters, to modules I1 and I2 of related radio interface GPRS or UMTS.

In the device SGSN 32 there is a module SGSN_SM 32b for every active radio-mobile terminal; the allocation of different modules SGSN_SM 32b is the responsibility of module SGSN_SM_Manager 32a. Module SGSN_SM_Manager 32a manages different typologies of modules SGSN_SM 32b.

Every module typology corresponds to a different QoS profile. Particularly, module SGSM_SM_Manager 32a obtains the typology to be used for allocation directly from radio-mobile terminal MS/UE 31, where the type of module SGSN_SM is stored in an attribute called "SGSN_SM_CLASS_TYPE."

In every radio-mobile terminal MS/UE, module MT_CC 21a is present if radio-mobile terminal 21 manages CS (Circuit Switched) connections; instead, module MT_SM 31a is present if radio-mobile terminal 31 manages PS (Packet Switched) connections.

The above-stated concepts are however well known to the skilled experts in the art: the previously-provided synthesis is primarily aimed therefore to facilitate the correct understanding of the herein described arrangement in one of its typical use context.

The herein described arrangement provides for the introduction of a "Quality of Service or QoS profile" of the type shown in FIG. 4, aimed to describe the parameters related to a type of simulated service.

With reference to a typical context of radio-mobile network, the considered parameters, defined in the standard (in a way that is largely independent from the technology: GSM, GPRS, UMTS, etc.) are as follows:

Traffic class 41: one among four possible values CONVERSATIONAL, STREAMING, INTERACTIVE, BACKGROUND;

Transfer delay 42: maximum transfer time of a data unity by transmitter to receiver;

Guaranteed bit-rate UL 43: guaranteed transfer speed for data that are transmitted by the radio-mobile terminal toward the network;

Maximum bit-rate UL 44: maximum transfer speed for data that are transmitted by the radio-mobile terminal toward the network;

Guaranteed bit-rate DL 45: guaranteed transfer speed for data that are transmitted by the network toward the radio-mobile terminal; and Maximum bit-rate DL 46: maximum transfer speed for data that are transmitted by the network toward the radio-mobile terminal.

A particular QoS profile identifies a type of service inside the simulator.

The simulator user can specify in input data the values of parameters of every simulated QoS profile.

The herein described solution provides particularly for the introduction, for every simulated user, of a parameter "QoSparams" relative to a particular QoS profile.

In the herein-shown embodiment (that must be remembered as such) in modules MT_CC 21a, MT_SM 31a, MSC_CC 22b and SGSN_SM 32b a parameter "QoSparams" is therefore present that corresponds to a QoS profile related to the single radio-mobile terminal: then, different radio-mobile terminals MS/UE can have modules MT_CC/MSC_CC or MT_SM/SGSN_SM with different parameters "QoSparams", and therefore they can simulate different services. It is thereby possible to define for every user his customised QoS profile.

The implementation of parameter "QoSparams" is performed in the ANSI C++ programming language by means of a class "QoSparams" included as follows:

```
class QoSparams
{
public:
    // COSTRUCT-DESTRUCT
    QoSparams ( ) ;
    virtual ~QoSparams ( ) ;
    virtual void empty ( ) ;
    virtual string toString ( ) const;
    // OPERATORS
    virtual void operator = (QoSparams & b) ;
    virtual void operator = (QoSparams * b) ;
    virtual void Dump(void) ;
    // METHODS GET
    inline  TRAFFIC  getTraffic(void)const  {return trafficClass;}
    inline Time gettransferDelay(void)const {return transferDelay;}
    inline double getUL__guaranteedBitRate(void)const {return UL__guaranteedBitRate;}
    inline double getDL__guaranteedBitRate(void)const {return DL__guaranteedBitRate;}
    inline  double  getUL__maximumBitRate(void)const {return UL__maximumBitRate;}
    inline  double  getDL__maximumBitRate(void)const {return DL__maximumBitRate;}
    inline int getTHP(void)const {return THP;}
    // METHODS SET
    inline  void  setTraffic(TRAFFIC newTraffic) {trafficClass = newTraffic;}
    inline  void  settransferDelay(Time newTime) {transferDelay = newTime;}
    inline  void  setUL__guaranteedBitRate(double newBitRate) {UL__guaranteedBitRate=newBitRate;}
    inline  void  setDL__guaranteedBitRate(double newBitRate) {DL__guaranteedBitRate=newBitRate;}
    inline  void  setUL__maximumBitRate(double newBitRate) {UL__maximumBitRate=newBitRate;}
    inline  void  setDL__maximumBitRate(double newBitRate) {DL__maximumBitRate=newBitRate;}
    inline  void  setTHP(int _THP) {THP=_THP;}
    // SERIALIZE
    virtual void serialize(PersistenceManager & p) ;
protected:
    // MEMBERS
    TRAFFIC           trafficClass;
    Time              transferDelay;
    double            UL__guaranteedBitRate;
    double            DL__guaranteedBitRate;
    double            UL__maximumBitRate;
    double            DL__maximumBitRate;
    int               THP;
private:
    //
    DECLARE__FACTORY(QoSparams) ;
    //
};
```

The herein described solution provides for an operation able to respect the QoS profile both for calls "originated"

from radio-mobile terminals MS/UE and for calls originated from the network (called "terminated").

In case of an "originated" call of the CS (Circuit Switched) type from radio-mobile terminal MS/UE, the module MT_CC 21*a* directly sends its own parameter "QoSparams" to the module MSC_CC 22*b*, that communicates it to the modules related to radio interface GSM or UMTS that establish the connection according to the type of service pointed out in "QoSparams."

FIG. 5 refers to the case of an "originated" call of the CS (Circuit Switched) type described as follows. The call originates in general from a given terminal (for instance a i-th terminal TMi or a j-th terminal TMj).

In step 1, the request for starting the connection is sent by the radio-mobile terminal toward the network, particularly to device MSC; in the starting request, module MT_CC 21*a* in calling terminal inserts parameter "QoSparams" with value equal to its own parameter "QoSparams."

In step 2, the device MSC receives the starting request and proceeds, through module MSC_CC_Manager, to the allocation of module MSC_CC related to radio-mobile terminal MS/UE. Depending on parameter "QoSparams" received by the device MSC in the starting request, module MSC_CC_Manager 22*a* determines the type of module MSC_CC to be allocated and allocates it for radio-mobile terminal MS/UE.

In step 3, the method of starting the call towards terminal TMi or TMj proceeds by using the correct QoS profile.

In case of an "originated" call of the PS (Packet Switched) type from radio-mobile terminal MS/UE, the operation is analogous to that related to the originated call CS: module MT_SGSN 31*a* directly sends its own parameter "QoSparams" to module SGSN_SM 32*b*, that communicates it to modules related to the radio interface GPRS or UMTS that establish the connection according to the type of service pointed out in "QoSparams."

FIG. 6 shows the case of an "originated" call of the PS (Packet Switched) type described as follows. Also in this case reference is made to a call originated from i-th terminal TMi (or from j-th terminal TMj).

In step 1, the starting request of the connection is sent by the radio-mobile terminal towards the network, particularly to device SGSN; in the starting request, module MT_SM 31*a* in terminal TMi inserts the parameter "QoSparams" with a value equal to its own parameter "QoSparams."

In step 2, the device SGSN receives the starting request and proceeds, through module SGSN_SM_Manager 32*a*, to the allocation of module SGSN_SM related to radio-mobile terminal MS/UE. Depending on parameter "QoSparams" received by device SGSN in the starting request, module SGSN_SM_Manager determines the type of module to be allocated SGSN_SM and allocates it for radio-mobile terminal MS/UE.

In step 3, the method of starting the call from terminal Tmi or TMj proceeds using the correct QoS profile.

In case of "terminated" call the indication of start of the connection is not sent by radio-mobile terminal MS/UE, but originates from simulated network devices. The starting request for a connection arrives therefore to modules in devices MSC 22 or SGSN 32 without any indication of what QoS profile to use.

The mechanism shown here as an example allows obtaining the QoS profile related to the radio-mobile terminal MS/UE to which the call is destined. As previously described, modules MSC_CC_Manager 22*a* and SGSN_SM_Manager 32*a* are respectively able to allocate different types of modules, respectively MSC_CC 22*b* and SGSN_SM 32*b*, directly obtaining it from radio-mobile terminal relative MS/UE (respectively attributes "MSC_CC_CLASS_TYPE" and "SGSN_SM_CLASS_TYPE").

Every type of modules MSC_CC or SGSN_SM is related therefore to a specific QoS profile (for instance SGSN_SM_QoS_A is related to module SGSN_SM with QoS profile type A, MSC_CC_QoS_C is related to module MSC_CC with QoS profile type C, . . . ).

FIG. 7 shows the case of an "terminated" call of the CS (Circuit Switched) type, described as follows.

In step 1, the starting request of the connection reaches device MSC from the network, with the indication of its related radio-mobile terminal MS/UE.

The device MSC sends the request to module MSC_CC_Manager for allocating module MSC_CC related to radio-mobile terminal MS/UE. In step 2, module MSC_CC_Manager obtains from radio-mobile terminal MS/UE which type of module MSC_CC and allocates it.

In step 3, the method of call start proceeds using the correct QoS profile.

FIG. 8 finally shows the case of an "terminated" call of the PS (Packet Switched) type, described as follows.

In step 1, the starting request of the connection reaches device SGSN from the network, with the indication of its related radio-mobile terminal MS/UE.

The device SGSN sends the request to module SGSN_SM_Manager for allocating module SGSN_SM related to radio-mobile terminal MS/UE. In step 2, module SGSN_SM_Manager obtains from radio-mobile terminal MS/UE which type of module SGSN_SM and allocates it.

Finally, in step 3, the method of call start proceeds using the correct QoS profile.

The herein described solution brings about some essential advantages.

Firstly, it is possible to define the parameters that describe every service from the point of view of quality requirements, using in the simulations a quality of service profile for every service that is desired to simulate.

It is then possible to define different QoS profiles for every simulated user and, accordingly, every simulated user can potentially use a different service from those used by the other users. The user, by filling-in his input data I, can then define the different services setting the parameters values of the QoS profile of every service to simulate.

Moreover, the operation for managing the QoS profiles provides both cases in which simulated calls are originated from mobile and terminated to mobile.

In case of simulation of originated calls, parameter "QoSparams" is specified by simulated terminal to blocks responsible for starting the connection during the connection starting procedure.

In case of simulation of finished calls, parameter "QoSparams" is adequately taken by the simulated terminal from the blocks responsible for starting the connection.

The implementation of the described simulator can be realized with any type of computer, like Intel, SUN, Apple, . . . and with any operating system (Windows, Linux, Unix, MAC OS . . . ). The use of the ANSI C++ programming language is only a possible choice since the implementation can also be performed in other programming languages, like Java, Delphi, Visual Basic, . . .

The choice of ANSI C++ language appears to be currently preferential in view of the good programming flexibility offered by said programming language and of the high level of obtainable performances in the finished program in terms of execution speed.

In the description the term simulated service means everything that deals with the transport step of user data, without needing to consider other service steps (set-up, re-configuration, service termination, etc.) that can anyway have an impact on the quality perceived by users.

This "approximation"—that must not be read in a limiting sense for the invention—is suggested by different reasons.

Firstly, it is usually scarcely practical to simulate multiple services in all their steps since there are various factors (service architecture, protocols involved in the various steps, apparatuses involved etc.) particular for the various services that can change from implementation to implementation of the same service.

It is usually then scarcely meaningful to perform simulations on the particular implementations of the various services since anyway, for reasons of modelling, scarcely results would be obtained.

Nevertheless, the invention can also be used by taking into account, on the basis of present description, the service steps, as for example set-up, re-configuration, service termination, etc. or part of them, in cases in which it is useful to consider the above steps for evaluating QoS.

The invention can be used in cellular networks simulators that simulate other systems besides the mentioned GSM, GPRS and UMTS. The invention can be used in telecommunications networks simulators of the fixed or mixed fixed/mobile types, for instance networks for which the management of the quality of service is provided as described in the present invention.

The skilled technicians in the field will immediately appreciate the fact that the invention does not necessarily deals only with the simulation of cellular radio-mobile networks: the invention can in fact be also used in other types of simulators, where there is an architecture similar to modules and devices complying with real physical equipment and where it is necessary to communicate, among the various modules/devices, the parameters related to simulated functionalities.

It is therefore evident that, having stated the principle of the invention, the realisation parts and the embodiments can be widely changed with respect to what is described and shown, without anyway departing from the scope of the present invention, as defined by the attached claims. This is valid particularly, but not exclusively, as regards the possible extension of the herein described solution to simulators in which every simulated user is associated with many quality of service profiles referred to services or classes of different services aimed to mutually interact (for instance audio/video streams aimed to be simultaneously exploited).

The invention claimed is:

1. A method, implemented using a computer system comprising a processor and a memory, for simulating a communications network through objects that model respective network devices, comprising the steps of:
   simulating, using the computer, through said objects, the supply of network services to a plurality of simulated network users according to respective quality of service profiles, wherein the simulating comprises:
   selectively associating some of the objects with respective simulated network users;
   selectively associating, using the computer, each of the plurality of simulated network users with a respective quality of service profile, of the plurality of quality of service profiles, wherein the associated quality of service profiles describe quality requirements of objects associated with the simulated network users;
   selectively identifying, using the computer, for each of said objects, at least one quality of service profile;
   dynamically configuring said objects, using the computer, to simulate the supply of the service to at least one of the plurality of simulated network users corresponding to said selectively identified quality of service profile; and
   dynamically varying the services to the at least one simulated network user, using the computer, by setting values of different parameters defining the at least one quality of service profile associated with the at least one simulated network user,
   wherein the steps are applied for simulating networks comprising a plurality of mobile terminals cooperating with blocks or network devices, and wherein the simulated network user comprises one of the plurality of mobile terminals for receiving network services.

2. The method according to claim 1, further comprising the steps of:
   performing at least one simulation, using the computer, in which every user uses a different service from that used by other users of said plurality of simulated network users.

3. The method according to claim 1, wherein the steps are applied, using the computer, for simulating networks comprising mobile terminals, said quality of service profile comprising parameters chosen from the group of:
   traffic class,
   maximum transfer time of a data unit,
   guaranteed transfer speed for data transmitted by mobile terminal toward the network,
   maximum transfer speed for data transmitted from mobile terminal toward the network,
   guaranteed transfer speed for data transmitted by the network toward a mobile terminal, and
   maximum transfer speed for data transmitted by the network toward a mobile terminal.

4. The method according to claim 1, wherein the steps are applied, using the computer, for simulating networks comprising mobile terminals connected through radio interfaces to a switching centre, said mobile terminals and said switching centre comprising respective control modules of calls, wherein, in case of simulation of a circuit switching call originated from a mobile terminal, the method comprises the step of directly sending said parameter from said control module of the mobile terminal toward the control module of the switching centre in view of the forwarding of said parameter to modules of the related radio interfaces that start the connection according to the type of service pointed out in said parameter.

5. The method according to claim 1, wherein the steps are applied, using the computer, for simulating networks comprising mobile terminals connected through radio interfaces to a network node, said mobile terminals and said network node comprising respective modules for managing the mobile terminal session and for managing the support node session, wherein, in case of simulation of a packet switching call originated from a mobile terminal, the method comprises the step of directly sending said parameter from said module for managing the mobile terminal session toward said module for managing the support node session in view of the forwarding of such parameter to the modules of the related radio interfaces that start the connection according to the type of service pointed out in said parameter.

6. The method according to claim 1, wherein the steps are applied, using the computer, for simulating networks comprising mobile terminals cooperating with blocks responsible for starting the connection, wherein, in case of simulation of a call originated from a terminal, said parameter is specified by said terminal to said blocks during the procedure for starting the connection.

7. The method according to claim 1, wherein the steps are applied, using the computer, for simulating networks comprising mobile terminals cooperating with blocks responsible for starting the connection, wherein, in case of simulation of a terminated call toward a determined network terminal, comprises the step of taking said parameter from the terminal object of the call, said taking step being performed by said blocks responsible for starting the connection.

8. The method according to claim 1, wherein the steps are applied, using the computer, for simulating networks comprising mobile terminals cooperating with network devices, comprising, in case of simulation of a terminated call on a mobile terminal, the step of sending the indication of connection start beginning from simulated network devices omitting the indication of what quality of service profile to use and obtaining said profile from the mobile terminal to which the call is directed.

9. A computer system for simulating a communications network, the computer system comprising:
 a processor comprising an engine for managing simulation of the communications network; and
 objects that model respective network devices, wherein said processor uses said objects to simulate the supply of network services to a plurality of simulated network users according to respective quality of service profiles, wherein some of the objects are selectively associated with respective simulated network users;
 wherein a respective quality of service profile is selectively associated, using said processor, with each of the simulated network users, wherein the associated quality of service profiles describe quality requirements of objects associated with the simulated network users;
 wherein said processor being configured to dynamically configure said objects to simulate the supply of services to at least one of the plurality of simulated network users corresponding to selectively identified quality of service profiles for each of said objects,
 wherein said processor being configured to vary the services to the at least one simulated network user by setting values of different parameters defining the quality of service profile associated with the at least one simulated network user, and
 wherein said processor being configured to simulate networks comprising a plurality of mobile terminals cooperating with blocks or network devices, and wherein the simulated network user comprises one of the plurality of mobile terminals for receiving network services.

10. The computer system according to claim 9, wherein:
 the system is configured for performing at least one simulation in which every simulated user uses a different service from that used by other users of said plurality of users.

11. The computer system according to claim 9, for simulating networks comprising mobile terminals, said quality of service profile comprising parameters chosen from the group of:
 traffic class,
 maximum transfer time of a data unit,
 guaranteed transfer speed for data transmitted by mobile terminal toward the network,
 maximum transfer speed for data transmitted from mobile terminal toward the network,
 guaranteed transfer speed for data transmitted by the network toward a mobile terminal, and
 maximum transfer speed for data transmitted by the network toward a mobile terminal.

12. The computer system according to claim 9, for simulating networks comprising mobile terminals connected through radio interfaces to a switching centre, said mobile terminals and said switching centre comprising respective control modules of calls wherein, in case of simulation of a circuit switching call originated from a mobile terminal, the system is configured for directly sending said parameter from said control module of the mobile terminal toward the control module of the switching centre in view of the forwarding of said parameter to modules of the related radio interfaces that start the connection according to the type of service pointed out in said parameter.

13. The computer system according to claim 9, for simulating networks comprising mobile terminals connected through radio interfaces to a network node, said mobile terminals and said network node comprising respective modules for managing a mobile terminal session and for managing a support node session, wherein, in case of simulation of a packet switching call originated from a mobile terminal, the system is configured for directly sending said parameter from said module for managing the mobile terminal session toward said module for managing the support node session in view of the forwarding of said parameter to the modules of the related radio interfaces that start the connection according to the type of service pointed out in said parameter.

14. The computer system according to claim 9, for simulating networks comprising terminals cooperating with blocks responsible for starting the connection, wherein, in case of simulation of a call originated from a terminal, the system is configured for specifying said parameter from said terminal to said blocks during the procedure for starting the connection.

15. The computer system according to claim 9, for simulating networks comprising terminals cooperating with blocks responsible for starting the connection, wherein, in case of simulation of a terminated call toward a certain network terminal, the system is configured for taking said parameter from the terminal object of the call, said taking being performed by said blocks responsible for starting the connection.

16. The computer system according to claim 9, for simulating networks comprising mobile terminals cooperating with network devices, wherein, in case of simulation of a terminated call on a mobile terminal, the system is configured for sending the indication of connection start beginning from simulated network devices by omitting the indication of what quality of service profile to use and by obtaining said profile from the mobile terminal to which the call is directed.

17. A communications network, comprising the computer system, implemented according to a method of any one of claims 1 and 2 to 8.

18. A non-transitory computer readable medium encoded with a computer program product loadable into a memory of at least one electronic computer, the computer program product comprising portions of software code for performing the method according to any one of claims 1 and 2-8.

* * * * *